(12) United States Patent
Yu et al.

(10) Patent No.: US 11,386,577 B2
(45) Date of Patent: Jul. 12, 2022

(54) IMAGE PROCESSING METHOD, IMAGE PROCESSING DEVICE, AND STORAGE MEDIUM

(71) Applicant: Beijing Xiaomi Pinecone Electronics Co., Ltd., Beijing (CN)

(72) Inventors: Pengfei Yu, Beijing (CN); Jiagao Hu, Beijing (CN); Fei Wang, Beijing (CN); Changxin Liu, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 1 day.

(21) Appl. No.: 16/983,024

(22) Filed: Aug. 3, 2020

(65) Prior Publication Data
US 2021/0295556 A1    Sep. 23, 2021

(30) Foreign Application Priority Data
Mar. 18, 2020   (CN) .......................... 202010192171.4

(51) Int. Cl.
G06T 7/73        (2017.01)
G06K 9/62        (2022.01)
G06V 10/50       (2022.01)

(52) U.S. Cl.
CPC ............. G06T 7/74 (2017.01); G06K 9/6227 (2013.01); G06V 10/50 (2022.01); *G06T 2207/20084* (2013.01)

(58) Field of Classification Search
CPC .............. G06K 9/6227; G06K 9/4642; G06T 2207/20084; G06T 7/74
See application file for complete search history.

(56) References Cited

U.S. PATENT DOCUMENTS 10,936,902 B1 *   3/2021   Bagwell ............... G06K 9/6254
11,288,818 B2 *   3/2022   Daniilidis ............ G06N 3/0472
(Continued)

FOREIGN PATENT DOCUMENTS

CN        109146967 A      1/2019
WO    WO 2017/015947 A1   2/2017

OTHER PUBLICATIONS

Zhou, B., et al., "Learning Deep Features for Discriminative Localization", Computer Science and Artiticial Intelligence Laboratory. MIT. mailed on Dec. 14, 2015. pp. 1-10.
(Continued)

*Primary Examiner* — Pinalben Patel
(74) *Attorney, Agent, or Firm* — Oblon, McClelland, Maier & Neustadt, L.L.P.

(57) ABSTRACT

The present disclosure relates to an image processing method that can include that an image to be processed is acquired, at least one category is selected via category information of the image to be processed, and a thermodynamic diagram for each category in the at least one category can be determined via the category information. The method can further include that a first positioning frame set corresponding to a target object in the image to be processed is respectively determined for the thermodynamic diagram for each category in the thermodynamic diagram for the at least one category, and a second positioning frame set of the image to be processed is determined according to an unsupervised target detection algorithm. Additionally, the method can include that a target positioning frame set in the image to be processed is determined according to the first positioning frame set and the second positioning frame set.

20 Claims, 7 Drawing Sheets

(56) References Cited

U.S. PATENT DOCUMENTS

2018/0165548 A1   6/2018  Wang et al.
2020/0159871 A1*  5/2020  Bowen .................... G06F 30/12

OTHER PUBLICATIONS

Hosang, J., et al., "What makes for effective detection proposals?", IEEE Transactions on Pattern Analysis & Machine Intelligence, mailed on Aug. 1, 2015, pp. 1-16.
Zitnick, C. L., et al., "Edge Boxes: Locating Object Proposals from Edges", ECCV. Springer International Publishing, 2014, pp. 391-405.
Extended European Search Report dated Feb. 8, 2021 in European Patent Application No. 20191597.2, 9 pages.
Ge Liu, et al., "Visualizing Feature Maps in Deep Neural Networks using DeepResolve a Genomics Case Study", Proceedings of Workshop on Visualization for Deep Learning, ICML vol. 70, XP055708938, Aug. 6, 2017, 10 pages.

* cited by examiner

IMAGE PROCESSING METHOD, IMAGE PROCESSING DEVICE, AND STORAGE MEDIUM

CROSS-REFERENCE TO RELATED APPLICATIONS

This application is based upon and claims priority to Chinese Patent Application No. 202010192171.4, filed on Mar. 18, 2020, the entire content of which is incorporated herein by reference.

TECHNICAL FIELD

The present disclosure relates to the technical field of image understanding, and more particularly, to an image processing method, an image processing device, and a storage medium.

BACKGROUND

With the rapid development of science and technology, society has entered the era of streaming media, and video and images contain rich information and gradually replace text as the main way for people to obtain information. In order to more conveniently utilize massive image files to obtain information, an image understanding technology of researching semantic information in images has been given more and more attention and the importance has been improved increasingly.

A traditional target detection method has poor recognition effect. Further, it has limitations on object categories in images, data acquisition and labeling are extremely difficult, and great labor and material costs are required to achieve a satisfactory effect.

SUMMARY

According to an aspect of embodiments of the present disclosure, an image processing method is provided. The image processing method may include acquiring an image to be processed, selecting at least one category based on category information, output by an image classifier, of the image to be processed, and determining a thermodynamic diagram for each category in the at least one category based on the category information. The method can also include respectively determining a first positioning frame set corresponding to a target object in the image to be processed for the thermodynamic diagram for each category in the thermodynamic diagram for the at least one category, the thermodynamic diagram for each category corresponding to one first positioning frame set, and determining a second positioning frame set of the image to be processed according to an unsupervised target detection algorithm. Further, the method can include determining a target positioning frame set in the image to be processed according to the first positioning frame set and the second positioning frame set; target positioning frames being configured to represent a position of the target object in the image to be processed.

According to another aspect of embodiments of the present disclosure, an image processing device is provided. The image processing device can include a processor and a memory that is configured to store instructions executable by the processor. The processor may be configured to implement the image processing method of any of the foregoing.

According to another aspect of embodiments of the present disclosure, a non-transitory computer-readable storage medium is provided. When instructions in the storage medium are executed by a processor of a mobile terminal, the mobile terminal can implement the image processing method of any of the foregoing.

It should be understood that the above general descriptions and the following detailed descriptions are exemplary and explanatory only, and are not intended to limit the disclosure.

BRIEF DESCRIPTION OF THE DRAWINGS

The accompanying drawings, which are incorporated in and constitute a part of this specification, illustrate exemplary embodiments consistent with the disclosure and, together with the specification, serve to explain the principles of the disclosure.

DETAILED DESCRIPTION

Exemplary embodiments will be described in detail herein, examples of which are illustrated in the accompanying drawings. When the following description refers to the accompanying drawings, the same numbers in different drawings represent the same or similar elements unless otherwise indicated. The implementations described in the following exemplary embodiments do not represent all implementations consistent with the disclosure. On the contrary, they are merely examples of devices and methods consistent with some aspects of the disclosure as detailed in the appended claims.

Figure 1:
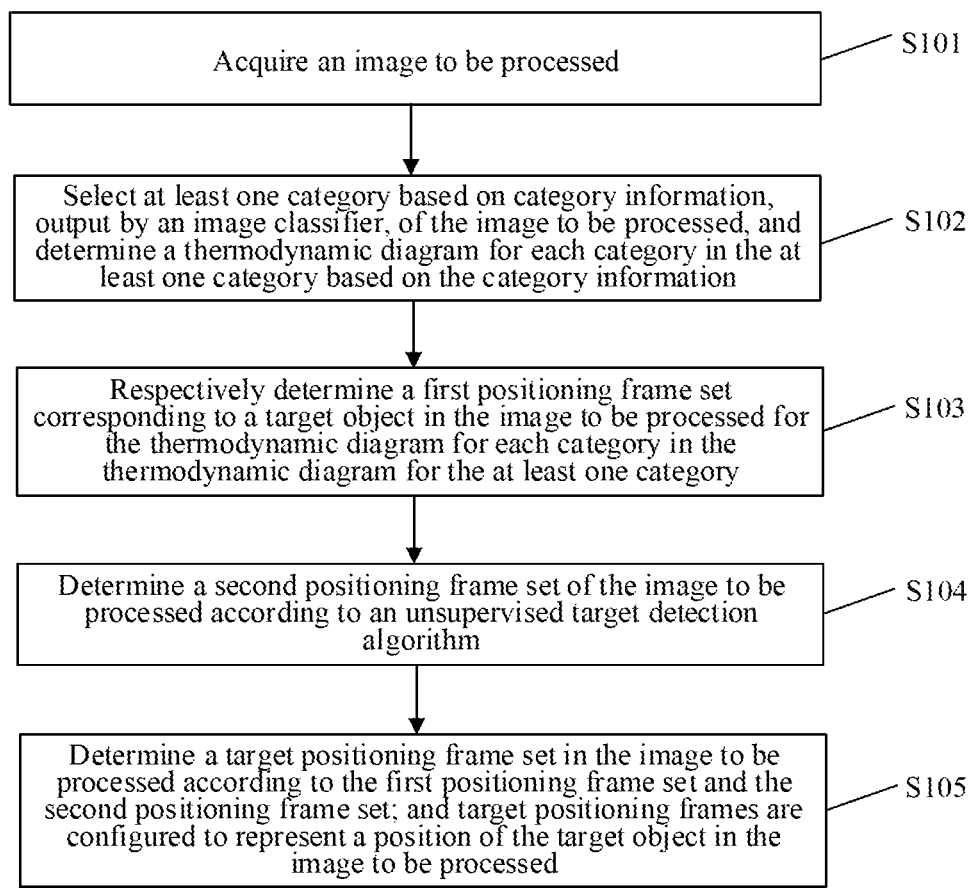
FIG. 1 is a flow chart showing an image processing method, according to an exemplary embodiment of the present disclosure.

FIG. 1 is a flow chart showing an image processing method, according to an exemplary embodiment of the present disclosure. As illustrated in FIG. 1, the image processing method includes operations as follows.

In step S101, an image to be processed is acquired. The image to be processed may be an image acquired in real time through an image collection device of a terminal and stored locally by the terminal, an image received from other terminals, or an image downloaded from a network. The image to be processed may be one or more. In an embodiment of the present disclosure, the acquired image to be processed is normalized in size, and the normalized image to be processed is classified by an image classifier. For example, the image to be processed is converted to be with a pixel number in height and width of 224*224 (multiply 224 by 224).

In step S102, at least one category is selected based on category information, output by the image classifier, of the image to be processed, and a thermodynamic diagram for each category in the at least one category is determined based on the category information. The image classifier may be trained by using collected image data, or an existing image classifier. The image to be processed passes through the image classifier, and the image classifier assigns a category label to the image to be processed from a given classification set. That is, the image classifier analyzes the input image to be processed and returns a classification label of the image to be processed.

The image classifier may be, for example, a convolutional neural networks (CNN)-based image classifier trained by using the collected image data. The CNN-based image classifier finally obtains an output result through a series of a convolution layer, a non-linear layer, a pooling layer and a fully connected layer, and the output result may be the probability of describing a single classification or a group of classifications of image contents. In the embodiment of the present disclosure, the image classifier may be a classification model such as Mobilenet, DenseNet and Mnasnet, or a suitable CNN model selected as required, and the kind of the image classifier is not limited in the present disclosure.

When the number of collected image categories is N, the image classifier can output an N-dimensional vector, and an ith dimension ($i \in \{1, 2, 3 \ldots N\}$) of the N-dimensional vector represents a confidence of an ith category for the image classified by the classifier. The image to be processed passes through the image classifier, category information of an object in the image to be processed can be output, and at least one category is selected based on the category information output by the image classifier.

The thermodynamic diagram is the same as the image to be processed in size and represents the response of the category of the object in the image to be processed at each pixel. For the image to be processed, the image classifier outputs values corresponding to N categories, the maximum value among the values is obtained, and the category corresponding to the maximum value is a final classification result of the image. The thermodynamic diagram corresponding to each category in the at least one category is obtained based on the category information, output by the image classifier, of the image to be processed.

At S103, a first positioning frame set corresponding to a target object in the image to be processed is respectively determined for the thermodynamic diagram for each category in the thermodynamic diagram for the at least one category, wherein the thermodynamic diagram for each category corresponds to one first positioning frame set.

For the thermodynamic diagram for each category, a region with a remarkable thermodynamic response value is displayed in the thermodynamic diagram, a connected domain is found in the region with the remarkable thermodynamic response value, surrounding frames of the connected domain are determined, and a set of the surrounding frames is the first positioning frame set corresponding to target object of the category in the image to be processed. A position of first positioning frames is a position, determined by using a depth learning algorithm, of the target object in the image to be processed.

In step S104, a second positioning frame set of the image to be processed is determined according to an unsupervised target detection algorithm. According to the unsupervised target detection algorithm, a detection frame is obtained through a feature of a current image, and the unsupervised target detection algorithm may be, for example, an EdgeBox algorithm. Edges of the target object in the image to be processed are detected through a structuring method, a contour of the target object is determined through edge points, and the second positioning frame set of the image to be processed is obtained. A position of second positioning frames is a position, determined according to the unsupervised target detection algorithm, of the target object.

In the embodiment of the present disclosure, the first positioning frame set, corresponding to the target object, in the image to be processed may be obtained firstly according to the thermodynamic diagram, and then the second positioning frame set of the image to be processed may be obtained according to the unsupervised target detection algorithm. Or, the second positioning frame set of the image to be processed may be obtained firstly according to the unsupervised target detection algorithm, and then the first positioning frame set, corresponding to the target object, in the image to be processed may be obtained according to the thermodynamic diagram. The method may also synchronously obtain the first positioning frame set, corresponding to the target object, in the image to be processed according to the thermodynamic diagram, and obtain the second positioning frame set of the image to be processed according to the unsupervised target detection algorithm. The sequence of determining the first positioning frame set and the second positioning frame set is not limited in the present disclosure.

In step S105, a target positioning frame set in the image to be processed is determined according to the first positioning frame set and the second positioning frame set, and target positioning frames are configured to represent the position of the target object in the image to be processed. The first positioning frame set includes the position, determined based on a depth neural network classification algorithm, of the target object in the image to be processed, and a traditional target detection algorithm and the depth learning algorithm are combined.

According to the embodiment of the present disclosure, the first positioning frames of the target object in the image to be processed are determined through the image classifier, and the second positioning frames of the image to be processed are determined according to the target detection algorithm. The traditional target detection algorithm is combined with the depth learning algorithm, the data acquisition difficulty is low, the data labeling amount is small, and the position of the target object in the image to be processed can be quickly and accurately determined.

In an embodiment, the category information includes category confidences of the image to be processed, and the at least one category is selected based on a sequence of the category confidences from large to small.

The category information includes the category confidences of the image to be processed. For the image to be processed, the image classifier outputs the category confidences corresponding to N categories, a maximum value of the category confidences is selected, and the category corresponding to the maximum value is the final classification result of the image. The category confidences are sorted from large to small in sequence, and at least one category in the image to be processed is selected, such that the calculation amount of data is reduced, the target positioning speed is faster, and the image processing efficiency is improved.

Figure 2:
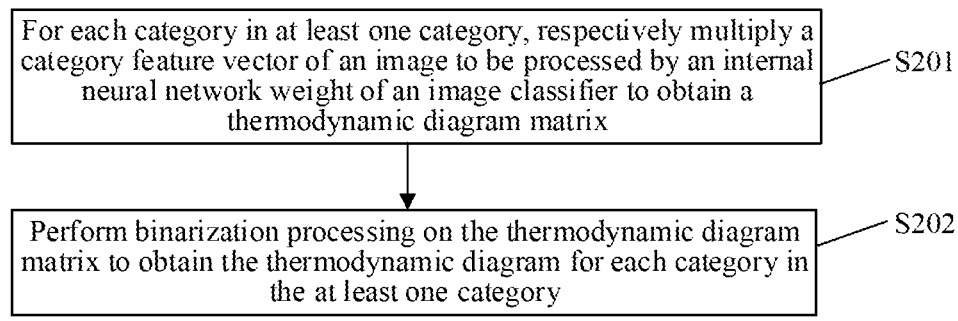
FIG. 2 is a flow chart showing an image processing method, according to another exemplary embodiment of the present disclosure.

FIG. 2 is a flow chart showing an image processing method, according to another exemplary embodiment of the present disclosure. Category information includes a category feature vector of an image to be processed. As illustrated in FIG. 2, the operation S102 in FIG. 1 includes operations as follows.

In step S201, for each category in the at least one category, the category feature vector of the image to be processed and an internal neural network weight of the image classifier are multiplied respectively to obtain a thermodynamic diagram matrix. A CNN-based image classifier includes a convolution layer, a non-linear layer, a pooling layer and a fully connected layer, the image to be processed passes through the image classifier, and finally an output result is obtained.

The output result of the image classifier is subjected to forward reasoning, a category feature vector F output by the convolution layer of the second last layer before an output layer is obtained, and when pixels in a height and a width of the image to be processed are 224 and 224, F is equal to 224*224*k, wherein k is a channel number of a neural network. It can be understood that the pixels in the height and width of the image to be processed may also be other pixel values, and an expression of the category feature vector F is changed accordingly. A neural network weight W after the global average pooling layer in front of the output layer of the image classifier is acquired, wherein W is equal to a k*N vector. Matrix multiplication is performed on the feature vector and the weight to obtain a vector with the dimension of 224*224*N, and an ith dimension (i∈{1, 2, 3 . . . N}) is taken as a thermodynamic diagram matrix of the category i, which is also referred to herein as the thermodynamic diagram matrix of the ith category. The thermodynamic diagram matrix of the ith category includes 224*224 numerical values, the numerical value in the thermodynamic diagram matrix can be referred to as a thermodynamic diagram response value and represent a response degree of the target object of the ith category at the position, that is, the larger the response of the target object of the ith category, the larger the numerical value.

In step S202, binarization processing is performed on the thermodynamic diagram matrix to obtain the thermodynamic diagram for each category in the at least one category. The binarization processing is performed on the thermodynamic diagram matrix corresponding to each category, that is, in a 224*224 matrix. A pixel point with a thermodynamic diagram response value higher than a preset threshold value is set as 255, and a pixel point with a thermodynamic diagram response value lower than the preset threshold value is set as 0. Or, a pixel point with a thermodynamic diagram response value higher than the preset threshold value is set as 0, and a pixel point with a thermodynamic diagram response value lower than the preset threshold value is set as 255. The preset threshold value may be selected as required. The thermodynamic diagram for each category of the image to be processed is obtained according to the thermodynamic diagram after binarization processing. The category confidences are sorted from large to small in sequence, first k categories with high confidences are selected, and the thermodynamic diagram for each category is obtained for each category in the k categories.

In an embodiment, for the thermodynamic diagram for each category in thermodynamic diagrams for all categories, a region greater than a parameter value is remarkably displayed on a 224*224 image, the region is framed out and is the position of a main body, and a first positioning frame set corresponding to the target object in the image to be processed is obtained. A region with a remarkable thermodynamic response value is displayed in the thermodynamic diagram, and a connected domain is found in the region with the remarkable thermodynamic response value. Surrounding frames of the connected domain are determined. A set of the surrounding frames is the first positioning frame set corresponding to the target object in the image to be processed. That is, at least one first positioning frame is determined in each thermodynamic diagram in k thermodynamic diagrams.

Figure 3:
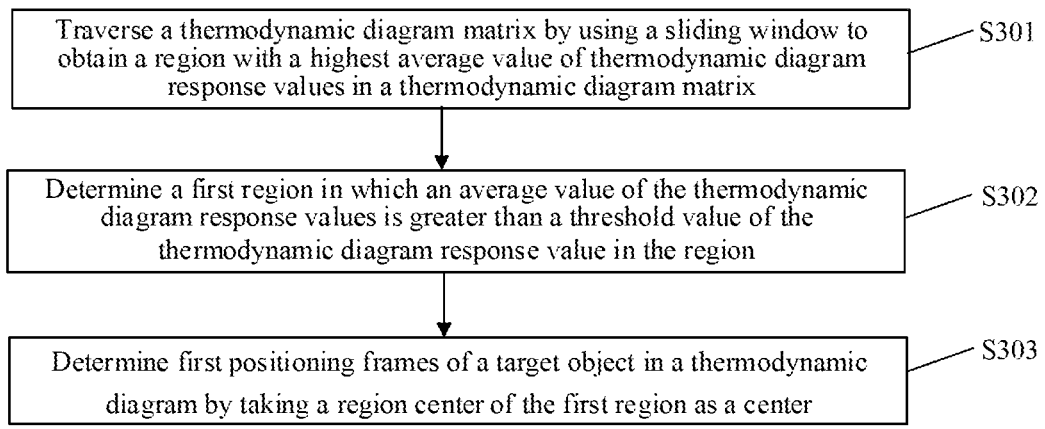
FIG. 3 is a flow chart showing an image processing method, according to another exemplary embodiment of the present disclosure.

FIG. 3 is a flow chart showing an image processing method, according to another exemplary embodiment of the present disclosure. As illustrated in FIG. 3, the operation S103 in FIG. 1 includes operations as follows.

At S301, a thermodynamic diagram matrix is traversed by using a sliding window to obtain a region with a highest average value of thermodynamic diagram response values in the thermodynamic diagram matrix. A sliding window of a preset size is determined for the thermodynamic diagram matrix corresponding to each category (i.e. a 224*224 matrix), and the size of the sliding window may be self-defined by a user as required, and may be, for example, 3*3, 5*5 or other size. The sliding window moves pixel by pixel in thermodynamic diagrams of an image to be processed, and the thermodynamic diagram matrix is traversed. The average value of the thermodynamic diagram response values in the sliding window is calculated, and the region with the highest thermodynamic diagram response value in the thermodynamic diagram matrix is obtained.

In step S302, a first region in which an average value of the thermodynamic diagram response values is greater than a threshold value of the thermodynamic diagram response value is determined in the region. The threshold value of the thermodynamic diagram response value is preset, and a region in which the average value of the thermodynamic diagram response values is greater than the threshold value of the thermodynamic diagram response value is determined as the first region in the region, and it can be understood that the first region may be one or more.

In step S303, first positioning frames of the target object in the thermodynamic diagrams are determined by taking a region center of the first region as a center. The region center of the first area is a position center of the target object of the category. The region center of the first region is taken as the center, the center is mapped back to the size of the original image to be processed, and the first positioning frames of the target object in the thermodynamic diagrams are determined on the image to be processed.

Figure 4:
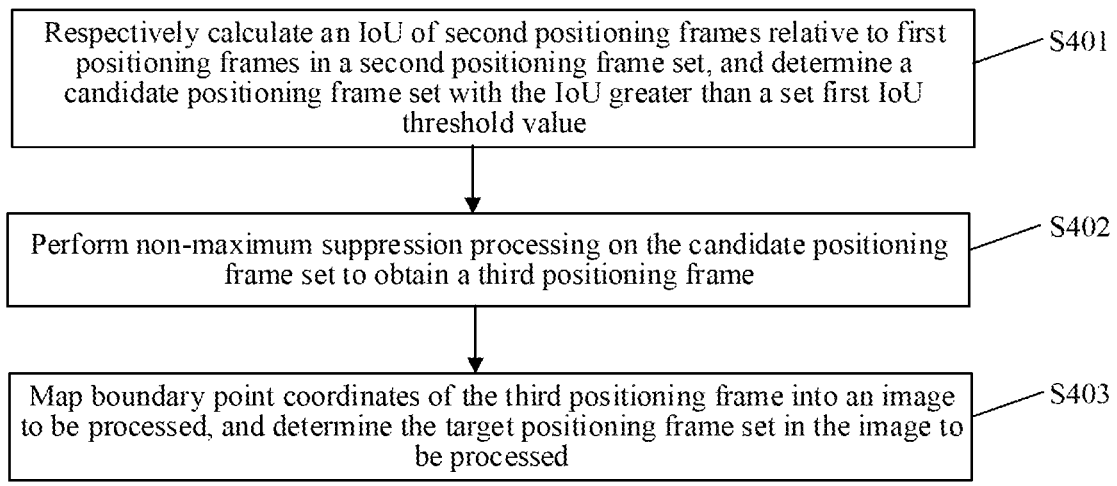
FIG. 4 is a flow chart showing an image processing method, according to another exemplary embodiment of the present disclosure.

FIG. 4 is a flow chart showing an image processing method, according to another exemplary embodiment of the present disclosure. As illustrated in FIG. 4, the operation S105 in FIG. 1 includes operations as follows.

In step S401, an intersection over union (IoU) of second positioning frames relative to first positioning frames is respectively calculated in the second positioning frame set, and a candidate positioning frame set with the IoU greater than a set first IoU threshold value is determined.

The second positioning frame set is the position, determined according to the traditional target detection algorithm, of the target object in the image to be processed. For each second positioning frame, the IoU of the second positioning frames relative to the first positioning frames is calculated, $$IoU = \frac{A \cap B}{A \cup B},$$

wherein A is the first positioning frames, B is the second positioning frames, and the IoU is a ratio of an intersection set of areas of the first positioning frames and the second positioning frames to a union set of areas of the first positioning frames and the second positioning frames, which reflects an overlapping rate of the first positioning frames and the second positioning frames.

The first IoU threshold value is set as β. Second positioning frames of which the IoU is less than β in the second positioning frame set are considered to have a low overlapping rate with the first positioning frames and are discarded in a candidate positioning frame, and a set of second positioning frames of which the IoU is greater than β is determined as the candidate positioning frame set.

At S402, non-maximum suppression (NMS) processing is performed on the candidate positioning frame set to obtain a third positioning frame. The NMS processing is performed on the second positioning frames in the candidate positioning frame set to obtain the third positioning frame. NMS is an algorithm for removing a non-maximum value. In the candidate positioning frame set in the image to be processed, parts overlapped with each other possibly exist among candidate positioning frames, and an optimal candidate positioning frame namely the third positioning frame is reserved by using the NMS algorithm.

At S403, boundary point coordinates of the third positioning frame are mapped into the image to be processed, and the target positioning frame set in the image to be processed is determined. The boundary point coordinates of the third positioning frame are mapped into the image to be processed through size scaling, and the target positioning frame set in the image to be processed is determined.

Figure 5:
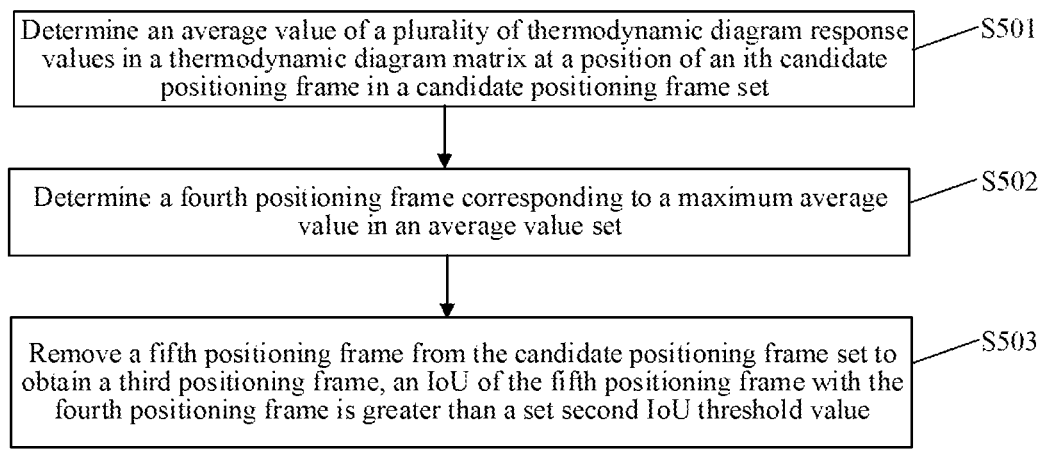
FIG. 5 is a flow chart showing an image processing method, according to another exemplary embodiment of the present disclosure.

FIG. 5 is a flow chart showing an image processing method, according to another exemplary embodiment of the present disclosure. As illustrated in FIG. 5, the operation S402 in FIG. 4 includes operations as follows.

In step S501, an average value of a plurality of thermodynamic diagram response values in a thermodynamic diagram matrix at a position of an ith candidate positioning frame in the candidate positioning frame set is determined. In the candidate positioning frame set, for each candidate positioning frame, the average value of the thermodynamic diagram response values in the thermodynamic diagram matrix corresponding to the range of the candidate positioning frames is calculated to obtain an average value set of the thermodynamic diagram response values corresponding to each candidate positioning frame.

In step S502, in the average value set, a fourth positioning frame corresponding to a maximum average value is determined. In the average value set, the maximum value in the average values of the thermodynamic diagram response values is determined, and the fourth positioning frame corresponding to the maximum average value is determined.

In step S503, a fifth positioning frame is removed from the candidate positioning frame set to obtain the third positioning frame, and an IoU of the fifth positioning frame with/relative to the fourth positioning frame is greater than a set second IoU threshold value. The second IoU threshold value α is set, and in the candidate positioning frame set, candidate positioning frames of which the IoU with the fourth positioning frame is greater than α are eliminated.

The next largest value in the average values of the thermodynamic diagram response values is obtained in the candidate positioning frame set remaining after elimination, positioning frames corresponding to the next largest value are determined, and positioning frames of which the IoU with the positioning frames corresponding to the next largest value greater than α are removed from the candidate positioning frame set. Thus, the third positioning frame of each local region of the image to be processed is obtained.

Figure 6:
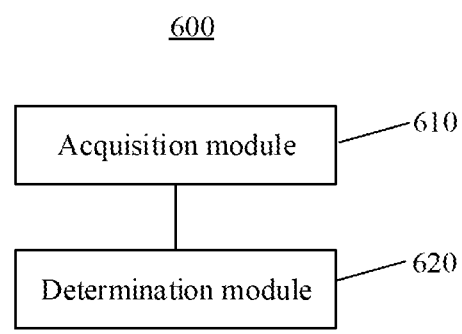
FIG. 6 is a block diagram of an image processing device, according to an exemplary embodiment of the present disclosure.

FIG. 6 is a block diagram of an image processing device, according to an exemplary embodiment of the present disclosure. As illustrated in FIG. 6, the image processing device 600 can include an acquisition module 610 and a determination module 620. Of course, it should be understood that the modules described in this disclosure can be implemented by processing circuitry.

The acquisition module 610 is configured to acquire an image to be processed.

The determination module 620 is configured to: select at least one category based on category information, output by an image classifier, of the image to be processed, and determine a thermodynamic diagram for each category in the at least one category based on the category information; respectively determine a first positioning frame set corresponding to a target object in the image to be processed for the thermodynamic diagram for each category in the thermodynamic diagram for the at least one category, the thermodynamic diagram for each category corresponding to one first positioning frame set; determine a second positioning frame set of the image to be processed according to an unsupervised target detection algorithm; and determine a target positioning frame set in the image to be processed according to the first positioning frame set and the second positioning frame set; target positioning frames being configured to represent a position of the target object in the image to be processed.

In an embodiment, the category information includes category confidences of the image to be processed; and when selecting the at least one category based on the category information, output by the image classifier, of the image to be processed, the determination module 620 is configured to select the at least one category in the image to be processed based on a sequence of the category confidences from large to small.

In an embodiment, the category information includes a category feature vector of the image to be processed; and when determining the thermodynamic diagram for each category in the at least one category based on the category information, the determination module 620 is configured to, for each category in the at least one category, respectively multiply the category feature vector of the image to be processed by an internal neural network weight of the image classifier to obtain a thermodynamic diagram matrix; and perform binarization processing on the thermodynamic diagram matrix to obtain the thermodynamic diagram for each category in the at least one category.

In an embodiment, when respectively determining the first positioning frame set corresponding to the target object in the image to be processed for the thermodynamic diagram for each category in the thermodynamic diagram for the at least one category, the determination module 620 is configured to: traverse the thermodynamic diagram matrix by using a sliding window to obtain a region with a highest average value of thermodynamic diagram response values in the thermodynamic diagram matrix; determine a first region in which an average value of the thermodynamic diagram response values is greater than a threshold value of the thermodynamic diagram response value in the region; and determine first positioning frames of the target object in the thermodynamic diagrams by taking a region center of the first region as a center.

In an embodiment, when determining the target positioning frame set in the image to be processed according to the first positioning frame set and the second positioning frame set, the determination module 620 is configured to: respectively calculate an IoU of second positioning frames relative to first positioning frames in the second positioning frame set, and determine a candidate positioning frame set with the IoU greater than a set first IoU threshold value; perform non-maximum suppression processing on the candidate positioning frame set to obtain a third positioning frame; and map boundary point coordinates of the third positioning frame into the image to be processed, and determine the target positioning frame set in the image to be processed.

In an embodiment, when performing the non-maximum suppression processing on the candidate positioning frame set to obtain the third positioning frame, the determination module 620 is configured to: determine an average value of a plurality of thermodynamic diagram response values in a thermodynamic diagram matrix at a position of an ith candidate positioning frame in the candidate positioning frame set; determine a fourth positioning frame corresponding to a maximum average value in an average value set; and remove a fifth positioning frame from the candidate positioning frame set to obtain the third positioning frame; an IoU of the fifth positioning frame with the fourth positioning frame is greater than a set second IoU threshold value.

With respect to the device in the above embodiments, the specific manners for performing operations for individual modules therein have been described in detail in the method embodiments, which will not be elaborated herein.

Figure 7:
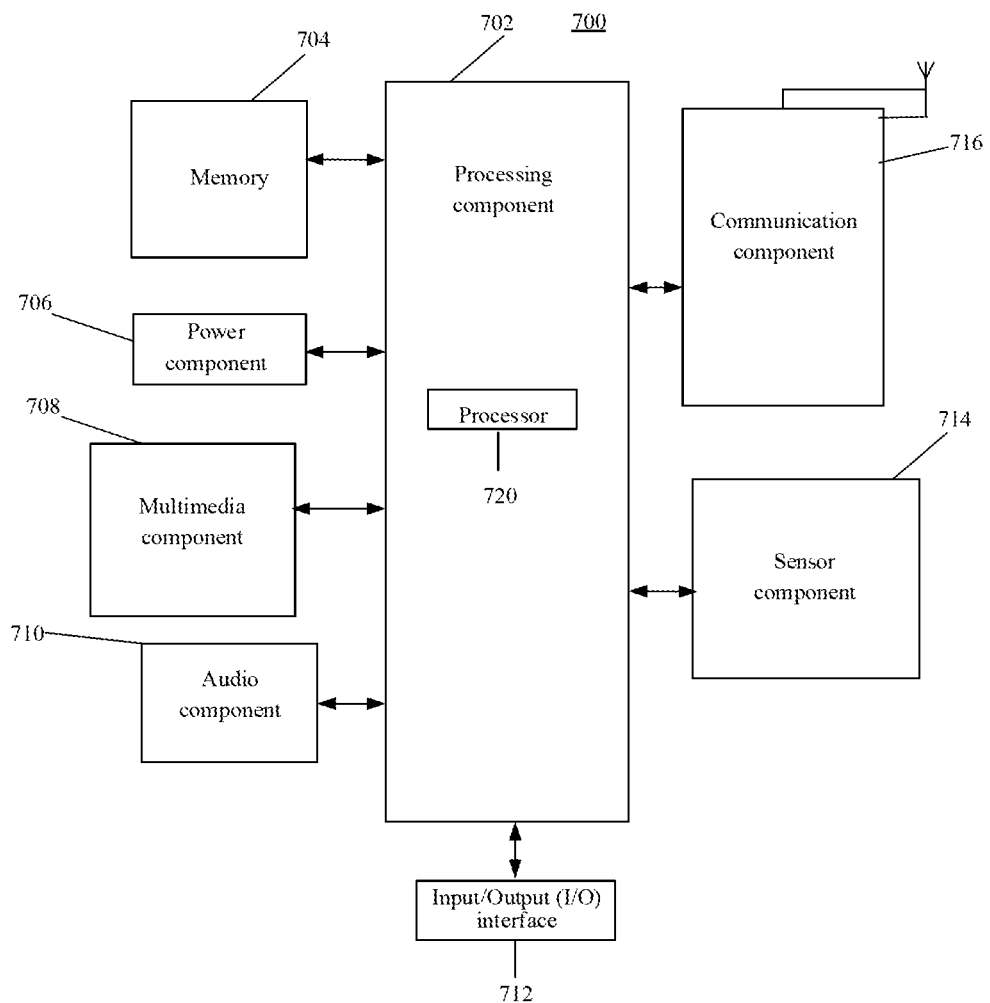
FIG. 7 is a block diagram of a device, according to an exemplary embodiment.

FIG. 7 is a block diagram of a device, according to an exemplary embodiment. For example, the image processing device 700 may be a mobile phone, a computer, a digital broadcast terminal, a messaging device, a gaming console, a tablet, a medical device, exercise equipment, a personal digital assistant, and the like.

Referring to FIG. 7, the image processing device 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls overall operations of the image processing device 700, such as the operations associated with display, telephone calls, data communications, camera operations, and recording operations. The processing component 702 may include one or more processors 720 to execute instructions to perform all or part of the steps in the method described above. In addition, the processing component 702 may include one or more modules which facilitate interaction between the processing component 702 and other components. For example, the processing component 702 may include a multimedia module to facilitate interaction between the multimedia component 708 and the processing component 702.

The memory 704 is configured to store various types of data to support the operation of the image processing device 700. Examples of such data include instructions for any applications or methods operated on the image processing device 700, contact data, phonebook data, messages, pictures, video, etc. The memory 704 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 706 provides power for various components of the image processing device 700. The power component 706 may include a power management system, one or more power supplies, and other components associated with generation, management and distribution of power for the image processing device 700.

The multimedia component 708 includes a screen that provides an output interface between the image processing device 700 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 708 includes a front camera and/or a rear camera. The front camera and/or the rear camera may receive external multimedia data when the image processing device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 710 includes a microphone (MIC), and the MIC is configured to receive an external audio signal when the image processing device 700 is in an operation mode, such as a call mode, a recording mode and a voice recognition mode. The received audio signal may further be stored in the memory 704 or sent through the communication component 716. In some embodiments, the audio component 710 further includes a speaker configured to output the audio signal.

The I/O interface 712 provides an interface between the processing component 702 and peripheral interface modules, such as a keyboard, a click wheel, buttons, and the like. The buttons may include, but are not limited to: a home button, a volume button, a starting button, and a locking button.

The sensor component 714 includes one or more sensors configured to provide status assessments in various aspects for the image processing device 700. For example, the sensor component 714 may detect an on/off status of the image processing device 700, and relative positioning of components, such as a display and small keyboard of the image processing device 700, and the sensor component 714 may also detect a change in a position of the image processing device 700 or a component of the image processing device 700, presence or absence of contact between the user and the image processing device 700, an orientation or acceleration/deceleration of the image processing device 700, and a change in temperature of the image processing device 700. The sensor component 714 may include a proximity sensor configured to detect presence of an object nearby without any physical contact. The sensor component 714 may also include a light sensor, such as a complementary metal oxide semiconductor (CMOS) or charge coupled device (CCD) image sensor, configured for use in an imaging application. In some embodiments, the sensor component 714 may also include an acceleration sensor, a gyroscope sensor, a magnetic sensor, a pressure sensor or a temperature sensor.

The communication component 716 is configured to facilitate wired or wireless communication between the image processing device 700 and other devices. The image processing device 700 may access a communication-standard-based wireless network, such as a wireless fidelity (WiFi) network, a 2nd-generation (2G) or 3G network, or a combination thereof. In an exemplary embodiment, the communication component 716 receives a broadcast signal or broadcast associated information from an external broadcast management system via a broadcast channel. In an exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the image processing device 700 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above methods.

In an exemplary embodiment, there is also provided a non-transitory computer-readable storage medium including instructions, such as included in the memory 704, executable by the processor 720 of the image processing device 700 for performing the above methods. For example, the non-transitory computer-readable storage medium may be a ROM, a random access memory (RAM), a compact disc read-only memory (CD-ROM), a magnetic tape, a floppy disc, an optical data storage device, and the like.

Other embodiments of the present disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and embodiments are considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure is only limited by the appended claims.

What is claimed is:

1. An image processing method, comprising:
acquiring an image to be processed;
selecting at least one category based on category information that is output by an image classifier of the image to be processed, and determining a thermodynamic diagram for each category in the at least one category based on the category information;
respectively determining a first positioning frame set corresponding to a target object in the image to be processed for the thermodynamic diagram for each category in the thermodynamic diagram for the at least one category, where the thermodynamic diagram for each category corresponds to one first positioning frame set;
determining a second positioning frame set of the image to be processed according to an unsupervised target detection algorithm; and
determining a target positioning frame set in the image to be processed according to the first positioning frame set and the second positioning frame set, where the target positioning frames are configured to represent a position of the target object in the image to be processed;
wherein the thermodynamic diagram is the same as the image to be processed in size and represents a response of the category of the object in the image to be processed at each pixel;
wherein the first positioning frame set includes the position, determined based on a depth neural network classification algorithm, of the target object in the image to be processed; and the second positioning frame set includes the position, determined according to the unsupervised target detection algorithm, of the target object in the image to be processed.

2. The image processing method of claim 1, wherein:
the category information includes category confidences of the image to be processed, and
selecting the at least one category based on the category information includes selecting the at least one category based on a sequence of the category confidences from large to small.

3. The image processing method of claim 2, wherein:
the category information includes a category feature vector of the image to be processed, and
determining the thermodynamic diagram for each category in the at least one category based on the category information further includes:
for each category in the at least one category, respectively multiplying the category feature vector of the image to be processed by an internal neural network weight of the image classifier to obtain a thermodynamic diagram matrix; and
performing binarization processing on the thermodynamic diagram matrix to obtain the thermodynamic diagram for each category in the at least one category.

4. The image processing method of claim 3, wherein respectively determining the first positioning frame set corresponding to the target object in the image to be processed for the thermodynamic diagram for each category in the thermodynamic diagram for the at least one category further comprises:
traversing the thermodynamic diagram matrix by using a sliding window to obtain a region with a highest average value of thermodynamic diagram response values in the thermodynamic diagram matrix;
determining a first region in which an average value of the thermodynamic diagram response values is greater than a threshold value of the thermodynamic diagram response value in the region; and
determining first positioning frames of the target object in the thermodynamic diagrams by taking a region center of the first region as a center.

5. The image processing method of claim 1, wherein determining the target positioning frame set in the image to be processed according to the first positioning frame set and the second positioning frame set further comprises:
respectively calculating an intersection over union (IoU) of second positioning frames relative to first positioning frames in the second positioning frame set, and determining a candidate positioning frame set with the IoU greater than a set first IoU threshold value;
performing non-maximum suppression processing on the candidate positioning frame set to obtain a third positioning frame; and mapping boundary point coordinates of the third positioning frame into the image to be processed and determining the target positioning frame set in the image to be processed.

6. The image processing method of claim 5, wherein performing the non-maximum suppression processing on the candidate positioning frame set to obtain the third positioning frame further comprises:
determining an average value of a plurality of thermodynamic diagram response values in a thermodynamic diagram matrix at a position of an ith candidate positioning frame in the candidate positioning frame set;
determining a fourth positioning frame corresponding to a maximum average value in an average value set; and
removing a fifth positioning frame from the candidate positioning frame set to obtain the third positioning frame, where an IoU of the fifth positioning frame with the fourth positioning frame is greater than a set second IoU threshold value.

7. The image processing method of claim 1, wherein the image to be processed passes through the image classifier, category information of an object in the image to be processed is output, and at least one category is selected based on the category information output by the image classifier.

8. The image processing method of claim 1, wherein for the thermodynamic diagram for each category, a region with a remarkable thermodynamic response value is displayed in the thermodynamic diagram, a connected domain is found in the region with the remarkable thermodynamic response value, surrounding frames of the connected domain are determined, and a set of the surrounding frames is the first positioning frame set corresponding to target object of the category in the image to be processed.

9. An image processing device, comprising:
a processor; and
a memory for storing instructions executable by the processor;
wherein the processor is configured to:
acquire an image to be processed; and
select at least one category based on category information that is output by an image classifier of the image to be processed, and determine a thermodynamic diagram for each category in the at least one category based on the category information;
respectively determine a first positioning frame set corresponding to a target object in the image to be processed for the thermodynamic diagram for each category in the thermodynamic diagram for the at least one category, where the thermodynamic diagram for each category corresponds to one first positioning frame set;
determine a second positioning frame set of the image to be processed according to an unsupervised target detection algorithm; and
determine a target positioning frame set in the image to be processed according to the first positioning frame set and the second positioning frame set, where the target positioning frames are configured to represent a position of the target object in the image to be processed;
wherein the thermodynamic diagram is the same as the image to be processed in size and represents a response of the category of the object in the image to be processed at each pixel;
wherein the first positioning frame set includes the position, determined based on a depth neural network classification algorithm, of the target object in the image to be processed; and the second positioning frame set includes the position, determined according to the unsupervised target detection algorithm, of the target object in the image to be processed.

10. The image processing device of claim 9, wherein:
the category information includes category confidences of the image to be processed, and
the processor is configured to select the at least one category in the image to be processed based on a sequence of the category confidences from large to small in response to selecting the at least one category based on the category information of the image to be processed.

11. The image processing device of claim 10, wherein:
the category information includes a category feature vector of the image to be processed, and
the processor is configured, in response to determining the thermodynamic diagram for each category in the at least one category based on the category information, to:
for each category in the at least one category, respectively multiply the category feature vector of the image to be processed by an internal neural network weight of the image classifier to obtain a thermodynamic diagram matrix; and
perform binarization processing on the thermodynamic diagram matrix to obtain the thermodynamic diagram for each category in the at least one category.

12. The image processing device of claim 11, wherein the processor is further configured, in response to respectively determining the first positioning frame set corresponding to the target object in the image to be processed for the thermodynamic diagram for each category in the thermodynamic diagram for the at least one category, to:
traverse the thermodynamic diagram matrix by using a sliding window to obtain a region with a highest average value of thermodynamic diagram response values in the thermodynamic diagram matrix;
determine a first region in which an average value of the thermodynamic diagram response values is greater than a threshold value of the thermodynamic diagram response value in the region; and
determine first positioning frames of the target object in the thermodynamic diagrams by taking a region center of the first region as a center.

13. The image processing device of claim 9, wherein the processor is further configured, in response to determining the target positioning frame set in the image to be processed according to the first positioning frame set and the second positioning frame set, to:
respectively calculate an intersection over union (IOU) of second positioning frames relative to first positioning frames in the second positioning frame set and determine a candidate positioning frame set with the greater than a set first threshold value;
perform non-maximum suppression processing on the candidate positioning frame set to obtain a third positioning frame; and
map boundary point coordinates of the third positioning frame into the image to be processed, and determine the target positioning frame set in the image to be processed.

14. The image processing device of claim 13, wherein the processor is further configured, in response to performing the non-maximum suppression processing on the candidate positioning frame set to obtain the third positioning frame, to:

determine an average value of a plurality of thermodynamic diagram response values in a thermodynamic diagram matrix at a position of an ith candidate positioning frame in the candidate positioning frame set;
determine a fourth positioning frame corresponding to a maximum average value in an average value set; and
remove a fifth positioning frame from the candidate positioning frame se to obtain the third positioning frame, where an IoU of the fifth positioning frame with the fourth positioning frame is greater than a set second IoU threshold value.

15. A non-transitory computer-readable storage medium having stored therein instructions that, when executed by a processor of a mobile terminal, cause the mobile terminal to perform an image processing method, the method comprising:
acquiring an image to be processed;
selecting at least one category based on category information that is output by an image classifier of the image to be processed and determining a thermodynamic diagram for each category in the at least one category based on the category information;
respectively determining a first positioning frame set corresponding to a target object in the image to be processed for the thermodynamic diagram for each category in the thermodynamic diagram for the at least one category, where the thermodynamic diagram for each category corresponds to one first positioning frame set;
determining a second positioning frame set of the image to be processed according to an unsupervised target detection algorithm; and
determining a target positioning frame set in the image to be processed according to the first positioning frame set and the second positioning frame set, where target positioning frames are configured to represent a position of the target object the image to be processed;
wherein the thermodynamic diagram is the same as the image to be processed in size and represents a response of the category of the object in the image to be processed at each pixel;
wherein the first positioning frame set includes the position, determined based on a depth neural network classification algorithm, of the target object in the image to be processed; and the second positioning frame set includes the position, determined according to the unsupervised target detection algorithm, of the target object in the image to be processed.

16. The non-transitory computer-readable storage medium of claim 15, wherein:
the category information includes category confidences of the image to be processed, and
selecting the at least one category based on the category information of the image to be processed further includes selecting the at least one category based on a sequence of the category confidences from large to small.

17. The non-transitory computer-readable storage medium of claim 16, wherein:
the category information includes a category feature vector of the image to be processed, and
determining the thermodynamic diagram for each category in the at least one category based on the category information further includes:
for each category in the at least one category, respectively multiplying the category feature vector of the image to be processed by an internal neural network weight of the image classifier to obtain a thermodynamic diagram matrix; and
performing binarization processing on the thermodynamic diagram matrix to obtain the thermodynamic diagram for each category in the at least one category.

18. The non-transitory computer-readable storage medium of claim 17, wherein respectively determining the first positioning frame set corresponding to the target object in the image to be processed for the thermodynamic diagram for each category in the thermodynamic diagram for the at least one category further comprises:
traversing the thermodynamic diagram matrix by using a sliding window to obtain a region with a highest average value of thermodynamic diagram response values in the thermodynamic diagram matrix;
determining a first region in which an average value of the thermodynamic diagram response values is greater than a threshold value of the thermodynamic diagram response value in the region; and
determining first positioning frames of the target object in the thermodynamic diagrams by taking a region center of the first region as a center.

19. The non-transitory computer-readable storage medium of claim 15, wherein determining the target positioning frame set in the image to be processed according to the first positioning frame set and the second positioning frame set further comprises:
respectively calculating an intersection over union (IoU) of second positioning frames relative to first positioning frames in the second positioning frame set, and determining a candidate positioning frame set with the IoU greater than a set first IoU threshold value;
performing non-maximum suppression processing on the candidate positioning frame set to obtain a third positioning frame; and
mapping boundary point coordinates of the third positioning frame into the image to be processed, and determining the target positioning frame set in the image to be processed.

20. The non-transitory computer-readable storage medium of claim 19, wherein performing the non-maximum suppression processing on the candidate positioning frame set to obtain the third positioning frame further includes:
determining an average value of a plurality of thermodynamic diagram response values in a thermodynamic diagram matrix at a position of an ith candidate positioning frame in the candidate positioning frame set;
determining a fourth positioning frame corresponding to a maximum average value in an average value set; and
removing a fifth positioning frame from the candidate positioning frame set to obtain the third positioning frame, where an IoU of the fifth positioning frame with the fourth positioning frame is greater than a set second IoU threshold value.

* * * * *